Nov. 24, 1959   B. J. AUDETTE   2,914,285
LICENSE PLATE BRACKET
Filed May 9, 1957
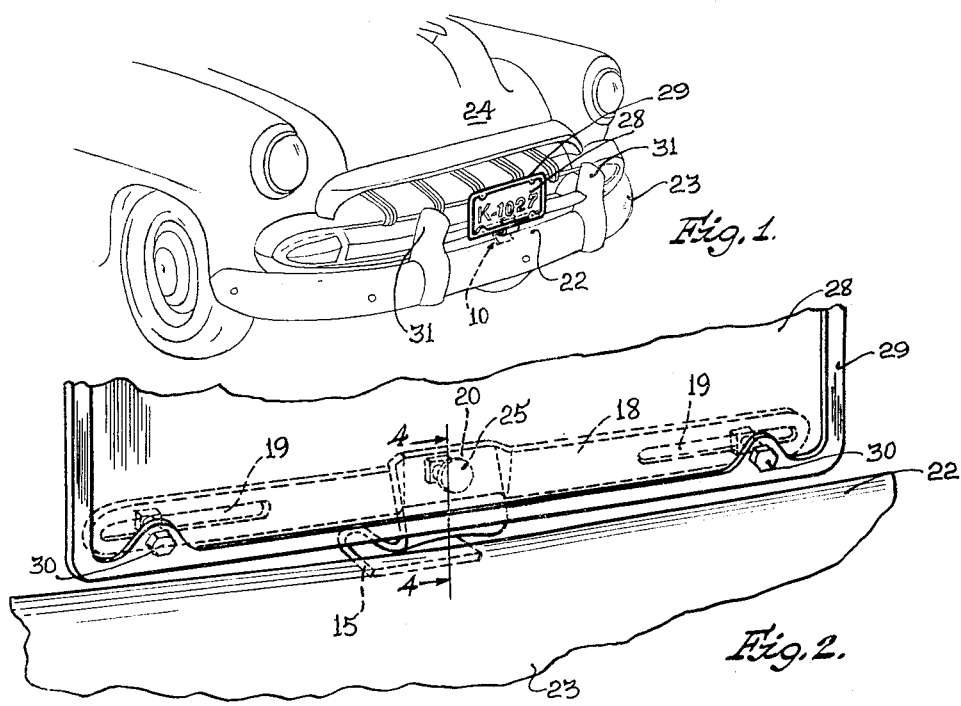
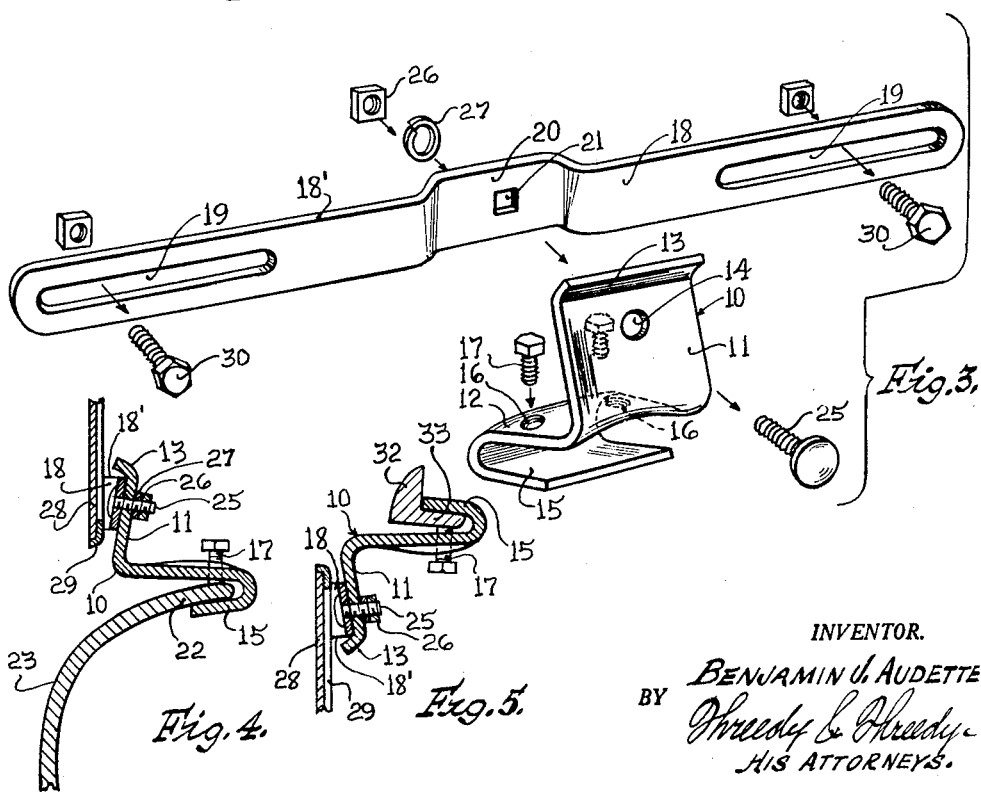
INVENTOR.
BENJAMIN J. AUDETTE
BY Threedy & Threedy
HIS ATTORNEYS.

United States Patent Office 2,914,285
Patented Nov. 24, 1959

2,914,285

LICENSE PLATE BRACKET

Benjamin J. Audette, Los Angeles, Calif., assignor to Benmatt Industries, Inc., Los Angeles, Calif., a corporation of California Application May 9, 1957, Serial No. 658,055

2 Claims. (Cl. 248—226)

This invention relates to a license plate bracket for use in connecting a license plate or its frame to an automobile bumper, bumperette, or grille, as desired, and has for its principal object the provision of an improved construction of this character which will be highly efficient in use and economical in manufacture.

Among the several objects of the invention is the provision of a bracket of the character herein described which is especially designed and adapted when connected to the bumper or the bumperette, or grille of an automobile, to support the license plate in a position where it will be protected from being bent or crumpled or otherwise damaged.

In most modern automobiles of today, the license plate is connected in a depending position with respect to the bumper of the automobile and in such position the license plate is subjected to being bent, crumpled or otherwise damaged. The object of this invention is to support the license plate in a position such that it will not be subjected to damage.

Another and equally important object of the invention is to provide a bar of a bracket structure with a medial portion offset with respect to the opposite end portions of such bar and inclined at an angle with respect to the transverse surface of said end portions whereby when the bar is connected to the clamp plate of the bracket structure, the license plate will be supported so as to extend in a substantially vertical plane.

Another and equally important object of my invention is to provide a bracket structure for the purposes hereinafter described, which is simple in manufacture, comprises relatively few parts, and can be easily and quickly attached to an automobile and to the license plate and/or license plate frame, without the use of special tools.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of my improved bracket showing the same attached to a bumper of an automobile;

Fig. 2 is an enlarged perspective view similar to that of Fig. 1, of a fragmentary portion of a bumper and license plate frame, showing the latter attached to the bumper by means of my improved bracket;

Fig. 3 is a perspective view of the several parts comprising my bracket showing the parts in exploded relation with respect to each other but different from their assembled relation;

Fig. 4 is a fragmentary sectional detail view taken substantially on line 4—4 of Fig. 2;

Fig. 5 is a fragmentary sectional detail view showing my improved bracket structure attached to an element of the grille of an automobile.

The several objects of my invention are preferably accomplished by the preferred form of construction shown in the accompanying drawings.

In this connection, 10 indicates a plate. This plate is formed substantially L-shaped to provide end portions 11 and 12 disposed substantially at right angles with respect to each other. The end portion 11 has an outwardly curved lip indicated at 13. Formed in the end portion 11 is an opening 14. The end portion 12 of the plate 10 is reversely bent upon itself to provide a clamp 15. The end portion 12 has spaced threaded openings 16 formed therein to receive threaded stud bolts 17.

Adapted to be associated with the plate 10 in a manner to be presently explained is a bracket bar 18 of substantially elongated formation. This bar 18 at its opposite end portions has formed therein longitudinally extending slots 19. The medial portion of the bar 18, as indicated at 20, is offset with respect to the opposite end portions of the bar. Such medial portion is disposed at an angle with respect to the transverse surfaces of the opposite end portions of the bar 18. In this medial portion of the bar 18 is formed a substantially square opening 21 which is adapted to register with the opening 14.

In Figs. 1, 2 and 4, I have shown the license plate and its frame attached to the upper edge portion 22 of the main bumper 23 of an automobile 24. To accomplish this, the clamp 15 is mounted on the edge portion 22 of the bumper 23. By means of the screws or bolts 17 which are threaded through the openings 16, the clamp 15 is securely connected to the edge portion 22 of the bumper 23. After this has been accomplished, the bar 18 is attached to the end portion 11 of the plate 10. This is accomplished by means of a nut-bearing bolt 25 which is projected through the openings 14 and 21, and which bolt has threaded thereon a nut 26 against a lock washer 27.

In mounting the bar 18 to the end portion 11 of the plate 10, it will be noted that the turned lip portion 13 of the end portion 11 of the plate 10 will properly position the medial portion 20 of the bar 18 with the openings 14 and 21 in registration with respect to each other, thereby greatly facilitating the assembly of these two parts. After the plate 10 and bar 18 have been connected together and mounted upon the edge portion 22 of the bumper 23, the license plate 28 and its frame 29, if so mounted in a frame, are attached to the bar 18 by means of nut-bearing bolts 30 which are projected through the elongated slots 19 of the bar 18 and through openings provided in the license plate 28 and/or its frame 29.

The elongated openings or slots 19 in the bar 18 permit adjustment of the license plate and/or its frame relative to the bar 18.

With the license plate supported in the position shown in Fig. 1, which position is above the bumper instead of below it, the license plate is protected from being bent or otherwise damaged. This is particularly so because the license plate will be supported above the bumper 23 between the bumper guide arms 31. In instances where it is more desirable to attach the license plate, or the license frame and plate, to an element of the grille 32 of the automobile, the clamp 15 is securely attached to an element 33 of the grille 32 as shown in Fig. 5. In this position the license plate 28, and its frame 29 (if such frame is used), is suspended in a downward position from the bracket arm or plate 10 above the bumper 23 and between the bumper guide arms 31, where the license plate will be protected from being bent or damaged.

As hereinbefore indicated, the offset medial portion 20 of the bar 18 inclines or tapers at an angle with respect to the transverse surfaces of the opposite ends of the bar 18. The purpose of this taper or angle of inclination of the offset portion 20 is to support the license plate at a proper vertical angle.

Should it be found that the license plate tilts forwardly of the vertical plane of the bumper or grille of the automobile at too great an angle when the bar 18 is positioned in the position shown in Fig. 4, the bar 18 may be positioned against the end portion 11 of the plate 10 with the taper of the recessed portion extending downwardly and outwardly as shown in Fig. 4. On the other hand, should it be found that the license plate tilts rearwardly of the vertical plane of the bumper or grille at too great an angle, the bar may be positioned with its medial portion engaging the end portion 11 of the plate 10 with the taper of the recessed portion extending upwardly and outwardly as shown in Fig. 5. In other words, the desired proper vertical angle of the license plate may be achieved by varying the mounting of the bar 18 so that the edge 18' thereof is either facing upwardly or downwardly, thus varying the degree of inclination of the bar 18. By this arrangement the license plate will be supported in a proper vertical plane with respect to the bumper or grille of the automobile.

It will be apparent from the foregoing description that my improved bracket for attaching a license plate, or license plate and frame, to an automobile comprises relatively few parts and may be attached to an automobile in such manner as to protect the license plate from being damaged.

My improved bracket is of a construction such as permits its use upon automobiles of different designs and models. Such bracket in no way detracts from the appearance of the automobile and supports the license plate, or license plate and frame, in a firm, attractive position upon the automobile.

While I have illustrated and described the preferred form of construction for carrying my invention into effect, this is capable of variation and modification without departing from the spirit of the invention. I, therefore, do not wish to be limited to the precise details of construction set forth but desire to avail myself of such variations and modifications as come within the scope of the appended claims.

Having thus described my invention, what I claim as new and desire to protect by Letters Patent is:

1. A mounting bracket for a license plate support comprising a plate substantially L-shaped with one end portion of the plate reversely bent to provide a clamp and the opposite end portion having an opening formed therein, said opposite end portion of said plate having a transversely extending lip for locating the license plate support with respect to said opposite end portion of said plate with the opening of said one end portion in registration with an opening formed in the license plate support, and a nut-bearing bolt adapted for projection through the opening of the license plate support and the opening of said opposite end portion of said plate for detachably connecting the license plate support to said bracket in a horizontal plane.

2. A mounting bracket for a license plate support comprising a plate substantially L-shaped with one end portion of the plate reversely bent to provide a clamp and the opposite end portion having an opening formed therein, said opposite end portion of said plate having a transversely extending lip for locating the license plate support with respect to said opposite end portion of said plate with the opening formed in the license plate support, and a nut-bearing bolt adapted for projection through the opening of the license plate support and the opening of said opposite end portion of said plate for detachably connecting the license plate support to said bracket in a horizontal plane, said one end portion of said plate having a threaded opening formed therein, and a mounting stud bolt adapted for threading into said threaded opening for connecting said one end portion of said plate to an element of an automobile.

References Cited in the file of this patent

UNITED STATES PATENTS

| | | |
|---|---|---|
| 1,154,847 | De Vore | Sept. 28, 1915 |
| 1,390,732 | Speicher | Sept. 13, 1921 |
| 1,468,153 | Hill | Sept. 18, 1923 |
| 2,461,114 | Goldberg | Feb. 8, 1949 |
| 2,718,006 | Bowers | Sept. 20, 1955 |